United States Patent
Tu et al.

(10) Patent No.: US 9,307,132 B2
(45) Date of Patent: Apr. 5, 2016

(54) CONTROL SYSTEM FOR INTEGRATING MULTIPLE SETS OF SENSING PLANE DATA

(75) Inventors: Yen-Hung Tu, Taipei (TW); Chung-Lin Chia, Taipei (TW); Wen-Chieh Pan, Taipei (TW)

(73) Assignee: Rich IP Technology Inc., Taipei (TW)

(*) Notice: Subject to any disclaimer, the term of this patent is extended or adjusted under 35 U.S.C. 154(b) by 758 days.

(21) Appl. No.: 13/356,190

(22) Filed: Jan. 23, 2012

(65) Prior Publication Data

US 2013/0100076 A1    Apr. 25, 2013

(30) Foreign Application Priority Data

Oct. 24, 2011 (TW) .............................. 100138437 A

(51) Int. Cl.
*H04N 5/225* (2006.01)
*H04N 5/232* (2006.01)

(52) U.S. Cl.
CPC ......... *H04N 5/2258* (2013.01); *H04N 5/23203* (2013.01)

(58) Field of Classification Search
CPC ............. H04N 5/2258; H04N 5/23203; G06F 2203/04106; G06F 3/0304–3/0325
USPC .................................................. 345/173–178
See application file for complete search history.

(56) References Cited

U.S. PATENT DOCUMENTS

| | | | | |
|---|---|---|---|---|
| 2004/0263885 A1* | 12/2004 | Tomczyk | ........................ | 358/1.9 |
| 2008/0181151 A1* | 7/2008 | Feher | ............................. | 370/310 |
| 2008/0284749 A1* | 11/2008 | Hsu et al. | ...................... | 345/173 |
| 2009/0244026 A1* | 10/2009 | Purdy et al. | .................... | 345/174 |
| 2010/0188353 A1* | 7/2010 | Yoon et al. | ..................... | 345/173 |
| 2010/0201643 A1* | 8/2010 | Tho et al. | ....................... | 345/173 |
| 2013/0009905 A1* | 1/2013 | Castillo et al. | ................ | 345/174 |
| 2013/0076678 A1* | 3/2013 | Kretz | ............................. | 345/173 |

* cited by examiner

*Primary Examiner* — Koosha Sharifi-Tafreshi
*Assistant Examiner* — Chun-Nan Lin
(74) *Attorney, Agent, or Firm* — Tracy M Heims; Apex Juris, Pllc

(57) ABSTRACT

A control system for integrating multiple sets of sensing plane data, including: a plurality of driving units, used for driving a plurality of sensor arrays to receive multiple sets of sensing plane data; and at least one control unit, used for integrating the multiple sets of sensing plane data into a set of image data and outputting the set of image data to a central processing unit, wherein the central processing unit is used for executing an application software program to convert the set of image data into multiple sets of array data.

20 Claims, 5 Drawing Sheets

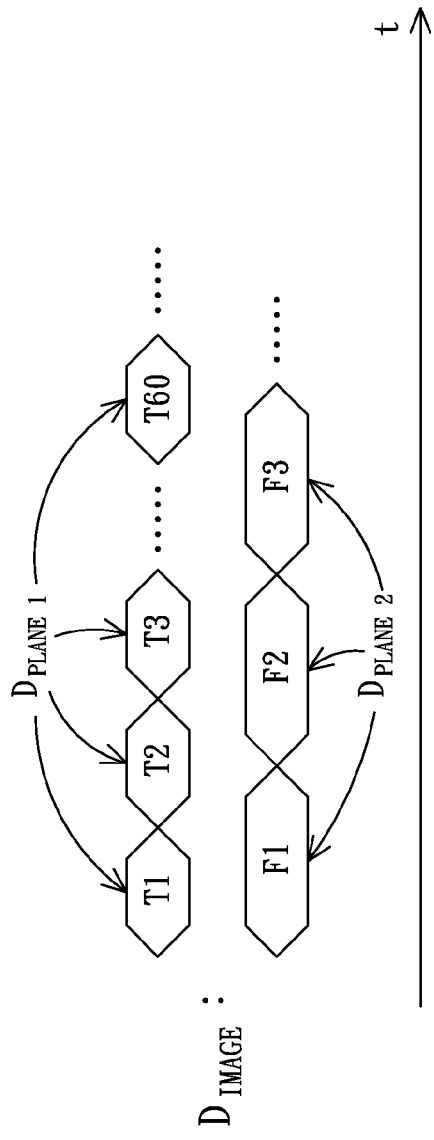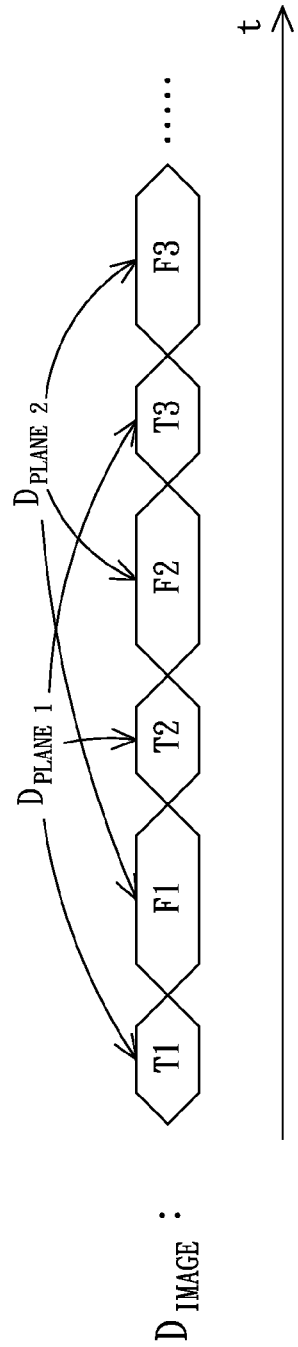
FIG. 5(a)
FIG. 5(b)

CONTROL SYSTEM FOR INTEGRATING MULTIPLE SETS OF SENSING PLANE DATA

BACKGROUND OF THE INVENTION

1. Field of the Invention

The present invention relates to a sensor control system, especially to a control system for integrating multiple sensor arrays, which is capable of integrating multiple sets of sensing plane data generated from multiple sensor arrays into a set of image data, and using an image processing procedure to derive information corresponding to each sensor array from the set of image data.

2. Description of the Related Art

As is known, a prior art sensor module like a touch module or a CCD (charge coupled device) module generally includes a driver unit and a control unit, wherein the control unit is used for: controlling the driver unit to scan a sensing plane of a sensor array; performing an analog signal processing procedure and a digital operation procedure on a sensed signal from the sensor array to generate a sensed output, wherein the sensed output can be of a digital type, an analog type, or a digital-analog-mixed type; and transmitting the sensed output to a central processing unit via a transmission interface.

However, when there are multiple sensor modules in a system, as the central processing unit needs multiple transmission interfaces to receive the sensed outputs of the multiple sensor modules, there will be a bunch of connection wires that not only occupy space but are prone to causing interference with the operation of nearby circuits.

Besides, as the formats of the sensed outputs of the sensor modules can be different, the central processing unit will need different transmission interfaces and different application software programs to receive the sensed outputs of the sensor modules, causing much inconvenience.

To solve the foregoing problems, a control system for integrating multiple sensor modules, which is capable of integrating the sensed output formats of the sensor modules to facilitate getting the sensed outputs of the sensor modules, is needed.

SUMMARY OF THE INVENTION

One objective of the present invention is to disclose a control system for integrating multiple sets of sensing plane data, which is capable of driving multiple sensor arrays in a multiplexing manner to receive multiple sets of sensing plane data, integrating the multiple sets of sensing plane data into a set of image data, and using a central processing unit to convert the set of image data to multiple sets of array data.

Another objective of the present invention is to disclose a control system for integrating multiple sets of sensing plane data, which is capable of: driving multiple sensor arrays of different types in a multiplexing manner; integrating sensing plane data of each of the multiple sensor arrays into a set of image data; and using a central processing unit to perform an application software program to convert the set of image data into multiple sets of array data.

To attain the foregoing objectives, a control system for integrating multiple sets of sensing plane data is proposed, the control system including a plurality of driver units and at least one control unit.

The plurality of driver units are used for driving multiple sensor arrays to receive multiple sets of sensing plane data.

The at least one control unit is used for integrating the multiple sets of sensing plane data into a set of image data, and transmitting the set of image data to a central processing unit, wherein the central processing unit is used for executing an application software program to convert the set of image data into multiple sets of array data.

Preferably, each of the multiple sensor arrays is selected from a group consisting of a touch sensor array, an optical image sensor array, a pressure sensor array, an surface acoustic wave sensor array, a flow sensor array, a particle sensor array, and a radio sensor array.

In one embodiment, the set of image data is formed by combining the multiple sets of sensing plane data in a parallel manner.

In another embodiment, the set of image data is formed by combining the multiple sets of sensing plane data in an interlacing manner.

Preferably, the driver unit has a multiplexer, an analog signal processing unit, and a timer/counter, so as to scan the multiple sensor arrays.

Preferably, the analog signal processing unit includes an analog-to-digital converter or an analog signal modulator, wherein, the analog signal modulator is used for generating an AM signal, a FM signal, or a CVBS signal.

To attain the foregoing objectives, another control system for integrating multiple sets of sensing plane data is proposed, the control system including a first driver unit, a second driver unit, and a control unit.

The first driver unit is used for driving a first sensor array to receive a set of first sensing plane data.

The second driver unit is used for driving a second sensor array to receive a set of second sensing plane data.

The control unit is used for integrating the set of first sensing plane data and the set of second sensing plane data into a set of image data, and transmitting the set of image data to a central processing unit, wherein the central processing unit is used for executing an application software program to convert the set of image data into two sets of array data.

In one embodiment, the first sensor array is a touch sensor array, the second sensor array is an optical image sensor array.

In one embodiment, the set of image data is formed by combining the set of first sensing plane data and the set of second sensing plane data in a parallel manner.

In another embodiment, the set of image data is formed by combining the set of first sensing plane data and the set of second sensing plane data in an interlacing manner.

Preferably, the first driver unit and the second driver unit both have a multiplexer, an analog signal processing unit, and a timer/counter, so as to scan the first sensor array and the second sensor array respectively.

Preferably, the analog signal processing unit includes an analog-to-digital converter or an analog signal modulator, wherein, the analog signal modulator is used for generating an AM signal, a FM signal, or a CVBS signal.

To attain the foregoing objectives, another control system for integrating multiple sets of sensing plane data is proposed, the control system including a first driver unit, a second driver unit, a first control unit, a second control unit, and an integration control unit.

The first driver unit is used for driving a first sensor array to receive a set of first sensing plane data.

The second driver unit is used for driving a second sensor array to receive a set of second sensing plane data.

The first control unit, coupled to the first driver unit, is used for controlling the first sensor array to perform a first sensing scan.

The second control unit, coupled to the second driver unit, is used for controlling the second sensor array to perform a second sensing scan.

The integration control unit, coupled to the first control unit and the second control unit, is used for integrating the set of first sensing plane data and the set of second sensing plane data into a set of image data, and transmitting the set of image data to a central processing unit, wherein the central processing unit is used for executing an application software program to convert the set of image data into two sets of array data.

In one embodiment, the first sensor array is a touch sensor array, and the second sensor array is an optical image sensor array.

In one embodiment, the set of image data is formed by combining the set of first sensing plane data and the set of second sensing plane data in a parallel manner.

In another embodiment, the set of image data is formed by combining the set of first sensing plane data and the set of second sensing plane data in an interlacing manner.

Preferably, the first driver unit and the second driver unit both have a multiplexer, an analog signal processing unit, and a timer/counter, so as to scan the first sensor array and the second sensor array.

Preferably, the analog signal processing unit includes an analog-to-digital converter or an analog signal modulator.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 5(a) illustrates a timing diagram for a set of image data $D_{IMAGE}$ in FIG. 3 and FIG. 4, wherein the set of image data $D_{IMAGE}$ is formed by combining a set of first sensing plane data $D_{PLANE1}$ and a set of second sensing plane data $D_{PLANE2}$ in a parallel manner.

FIG. 5(b) illustrates a timing diagram for a set of image data $D_{IMAGE}$ in FIG. 3 and FIG. 4, wherein the set of image data $D_{IMAGE}$ is formed by combining a set of first sensing plane data $D_{PLANE1}$ and a set of second sensing plane data $D_{PLANE2}$ in an interlacing manner.

DETAILED DESCRIPTION OF THE PREFERRED EMBODIMENTS

The present invention will be described in more detail hereinafter with reference to the accompanying drawings that show the preferred embodiments of the invention.

Figure 1:
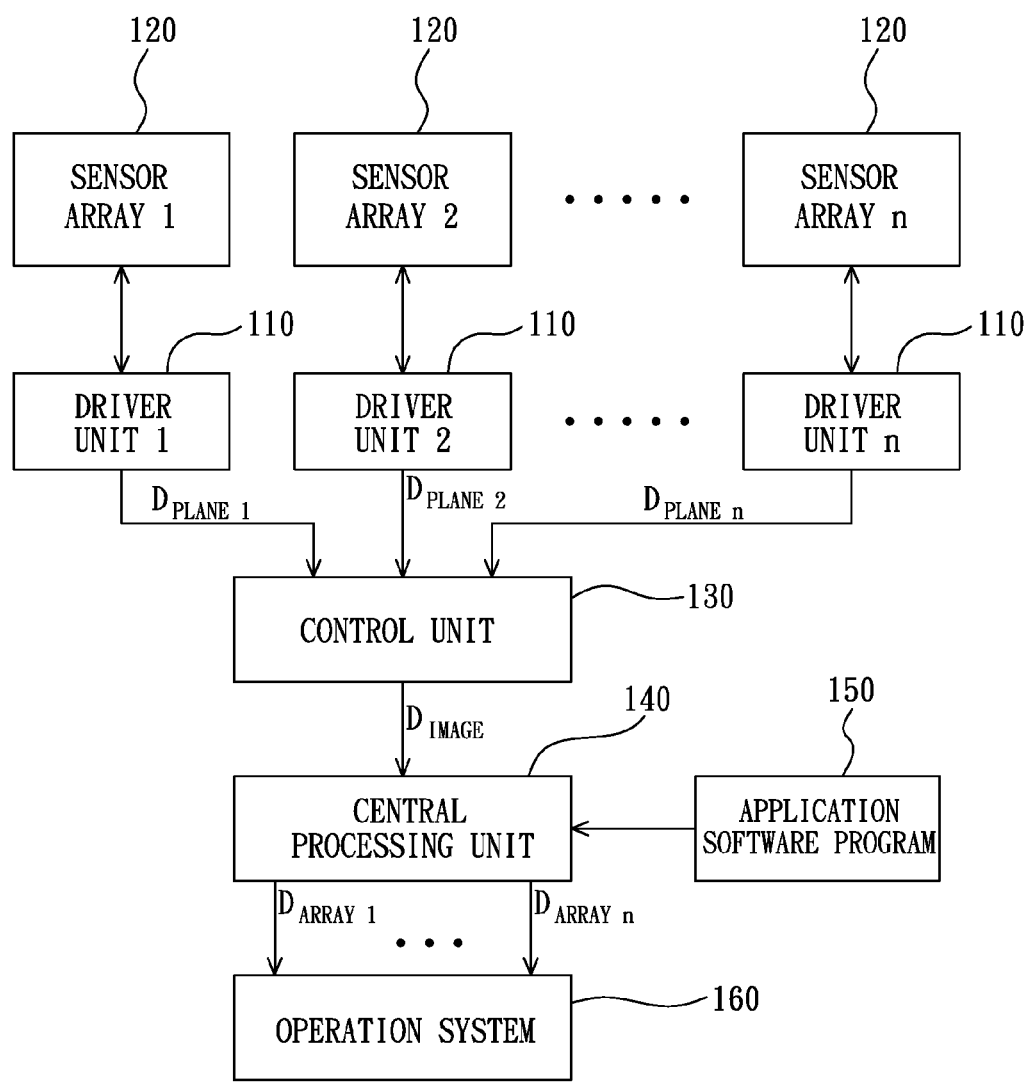
FIG. 1 illustrates the block diagram of a control system for integrating multiple sets of sensing plane data according to a preferred embodiment of the present invention.

Please refer to FIG. 1, which illustrates the block diagram of a control system for integrating multiple sets of sensing plane data according to a preferred embodiment of the present invention. As illustrated in FIG. 1, the control system includes a plurality of driver unit 110, multiple sensor arrays 120, a control unit 130, a central processing unit 140, an application software program 150, and an operation system 160.

Figure 2:
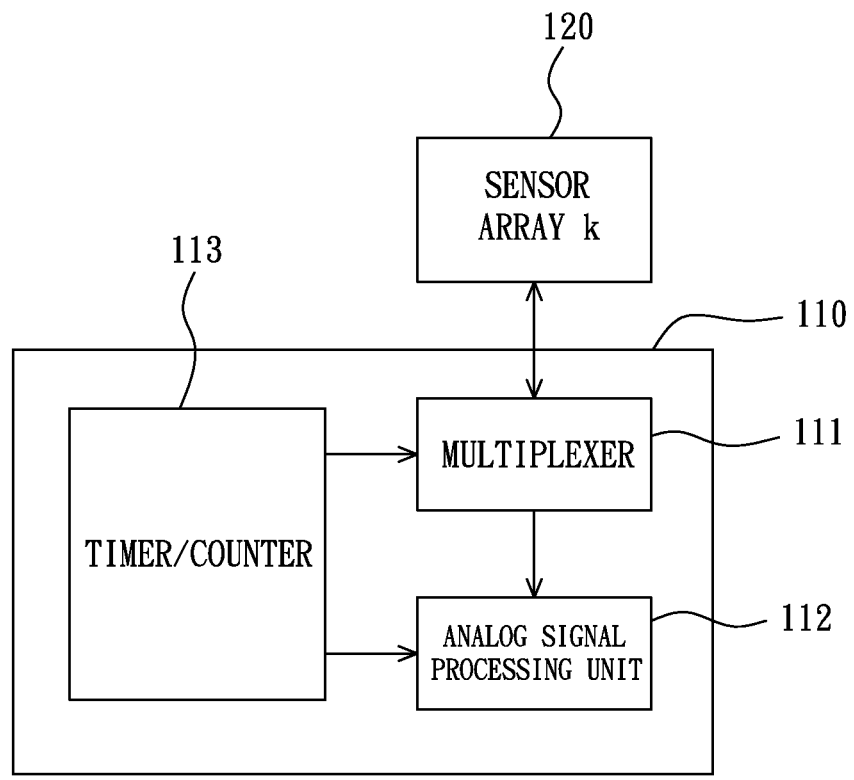
FIG. 2 illustrates the block diagram of one embodiment of the driver unit in FIG. 1.

The plurality of driver units 110 are used for driving the multiple sensor arrays 120 to receive multiple sets of sensing plane data—$D_{PLANE1}$, $D_{PLANE2}$, ... $D_{PLANEn}$, wherein $D_{PLANE1}$ stands for a set of first sensing plane data, $D_{PLANE2}$ stands for a set of second sensing plane data, and $D_{PLANEn}$ stands for a set of nth sensing plane data. One embodiment of the driver unit 110 is illustrated in FIG. 2. As can be seen in FIG. 2, the driver unit 110 has a multiplexer 111, an analog signal processing unit 112, and a timer/counter 113. The multiplexer 111, coupled to the sensor array 120, is used for scanning the sensor array 120 under the control of the timer/counter 113, so as to deliver a sensed signal to the analog signal processing unit 112. The analog signal processing unit 112 can include an analog-to-digital converter or an analog signal modulator, wherein, the analog signal modulator is used for generating an AM signal, an FM signal, or a CVBS (composite video broadcast signal) signal.

The sensor array 120, which can be a touch sensor array, an optical image sensor array, a pressure sensor array, a surface acoustic wave sensor array, a flow sensor array, a particle sensor array, or a radio sensor array, is driven by the driver unit 110 to perform a sensing scanning to generate one set of the multiple sets of sensing plane data.

The control unit 130 is used for integrating the multiple sets of sensing plane data into a set of image data $D_{IMAGE}$, and transmitting the set of image data $D_{IMAGE}$ to the central processing unit 140, wherein the central processing unit 140 is used for executing an application software program 150, which includes an image processing procedure, to convert the set of image data $D_{IMAGE}$ into multiple sets of array data— $D_{ARRAY1}$, ... $D_{ARRAYn}$, wherein $D_{ARRAY1}$ stands for the set of first array data, and $D_{ARRAYn}$ stands for the set of nth array data—so as to make the operation system 160 execute at least one corresponding function. The operation system 160 can be WINDOWS, UNIX, MacOS, iOS, or Android. The corresponding function can be: generating a touch coordinate according to one set of the multiple sets of array data and activating an object function corresponding to the touch coordinate; displaying a sensed image of a physical quantity—like photo, pressure, surface acoustic wave, flow, electromagnetic wave, performing a comparison operation on the sensed image and a reference image, and determining the execution of a corresponding procedure according to the result of the comparison operation; or generating a multi dimensional sensed image according to some or all of the multiple sets of array data, so as to provide a multi dimensional sensing function.

Besides, the set of image data $D_{IMAGE}$ can be formed by combining the multiple sets of sensing plane data in a parallel manner or in an interlacing manner.

Preferably, the central processing unit 140 is also coupled to a display (not shown in the figure), which can be a CRT display, a liquid crystal display, an LED array display, an OLED (organic light emitting diode) display, a PLED (polymer light emitting diode) display, a CNT-FED (carbon nanotube field emission display), a MEMS (micro electro mechanical systems) array display, a plasma display, or an e-paper display.

Figure 3:
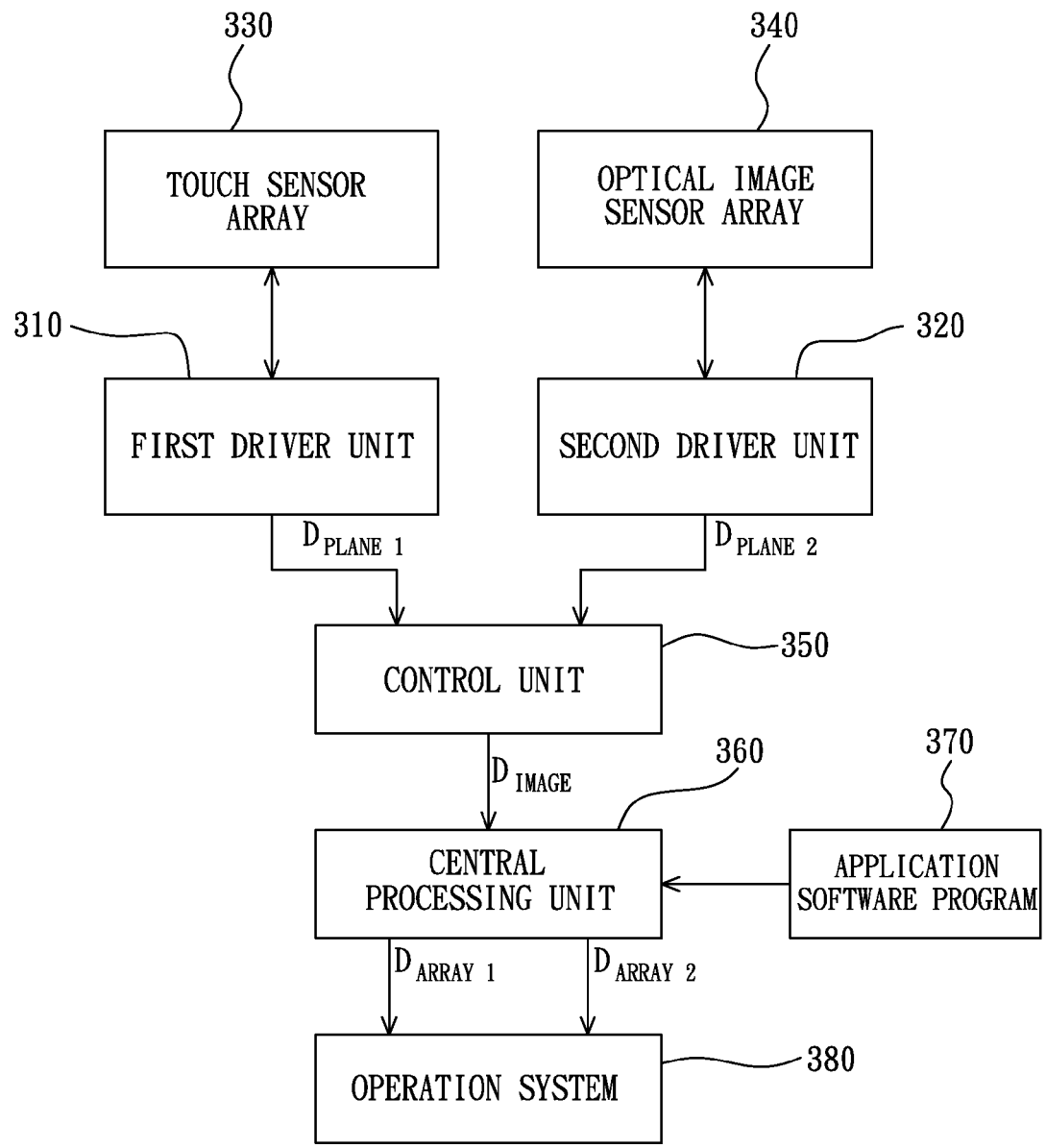
FIG. 3 illustrates the block diagram of a control system for integrating multiple sets of sensing plane data according to another preferred embodiment of the present invention.

Please refer to FIG. 3, which illustrates the block diagram of a control system for integrating multiple sets of sensing plane data according to another preferred embodiment of the present invention. As illustrated in FIG. 3, the control system includes a first driver unit 310, a second driver unit 320, a touch sensor array 330, an optical image sensor array 340, a control unit 350, a central processing unit 360, an application software program 370, and an operation system 380.

The first driver unit 310 is used for driving the touch sensor array 330 to receive a set of first sensing plane data $D_{PLANE1}$; the second driver unit 320 is used for driving the optical image sensor array 340 to receive a set of second sensing plane data $D_{PLANE2}$, wherein the touch sensor array 330 can be of resistive type, capacitive type, surface acoustic wave type, or electromagnetic type, and the optical image sensor array 340 can be a CCD or CMOS sensor array. The first driver unit 310 and the second driver unit 320 both have a multiplexer, an analog signal processing unit, and a timer/counter (please refer to FIG. 2). The multiplexer is used for scanning the touch sensor array 330 or the optical image sensor array 340 under the control of the timer/counter, so as to transmit a sensed signal to the analog signal processing unit. The analog signal processing unit can include an analog-to-digital converter or an analog signal modulator, wherein, the analog signal modulator is used for generating an AM signal, an FM signal, or a CVBS signal.

The control unit 350 is used for integrating the set of first sensing plane data $D_{PLANE1}$ and the set of second sensing plane data $D_{PLANE2}$ into a set of image data $D_{IMAGE}$, and transmitting the set of image data $D_{IMAGE}$ to the central processing unit 360, wherein the central processing unit 360 is used for executing an application software program 370, which includes an image processing procedure, to convert the set of image data $D_{IMAGE}$ into a set of first array data $D_{ARRAY1}$ and a set of second array data $D_{ARRAY2}$ so that the operation system 380 can execute at least one corresponding function. The operation system 380 can be WINDOWS, UNIX, LINUX, MacOS, iOS, or Android. The corresponding function can be: generating a touch coordinate according to the set of first array data $D_{ARRAY1}$ and activating an object function corresponding to the touch coordinate; or displaying an optical sensed image according to the set of second array data $D_{ARRAY2}$, performing a comparison operation on the optical sensed image and a reference image, and determining the execution of a corresponding procedure according to the result of the comparison operation; or generating a multi dimensional sensed image according to the set of first array data $D_{ARRAY1}$ and the set of second array data $D_{ARRAY2}$, so as to provide a multi dimensional sensing function.

Besides, the set of image data $D_{IMAGE}$ can be formed by combining the set of first sensing plane data $D_{ARRAY1}$ and the set of second sensing plane data $D_{ARRAY2}$ in a parallel manner—please refer to FIG. 5(a), or in an interlacing manner—please refer to FIG. 5(b).

Preferably, the central processing unit 360 is also coupled to a display (not shown in the figure), which can be a CRT display, a liquid crystal display, an LED array display, an OLED (organic light emitting diode) display, a PLED (polymer light emitting diode) display, a CNT-FED (carbon nanotube field emission display), a MEMS (micro electro mechanical systems) array display, a plasma display, or an e-paper display.

Figure 4:
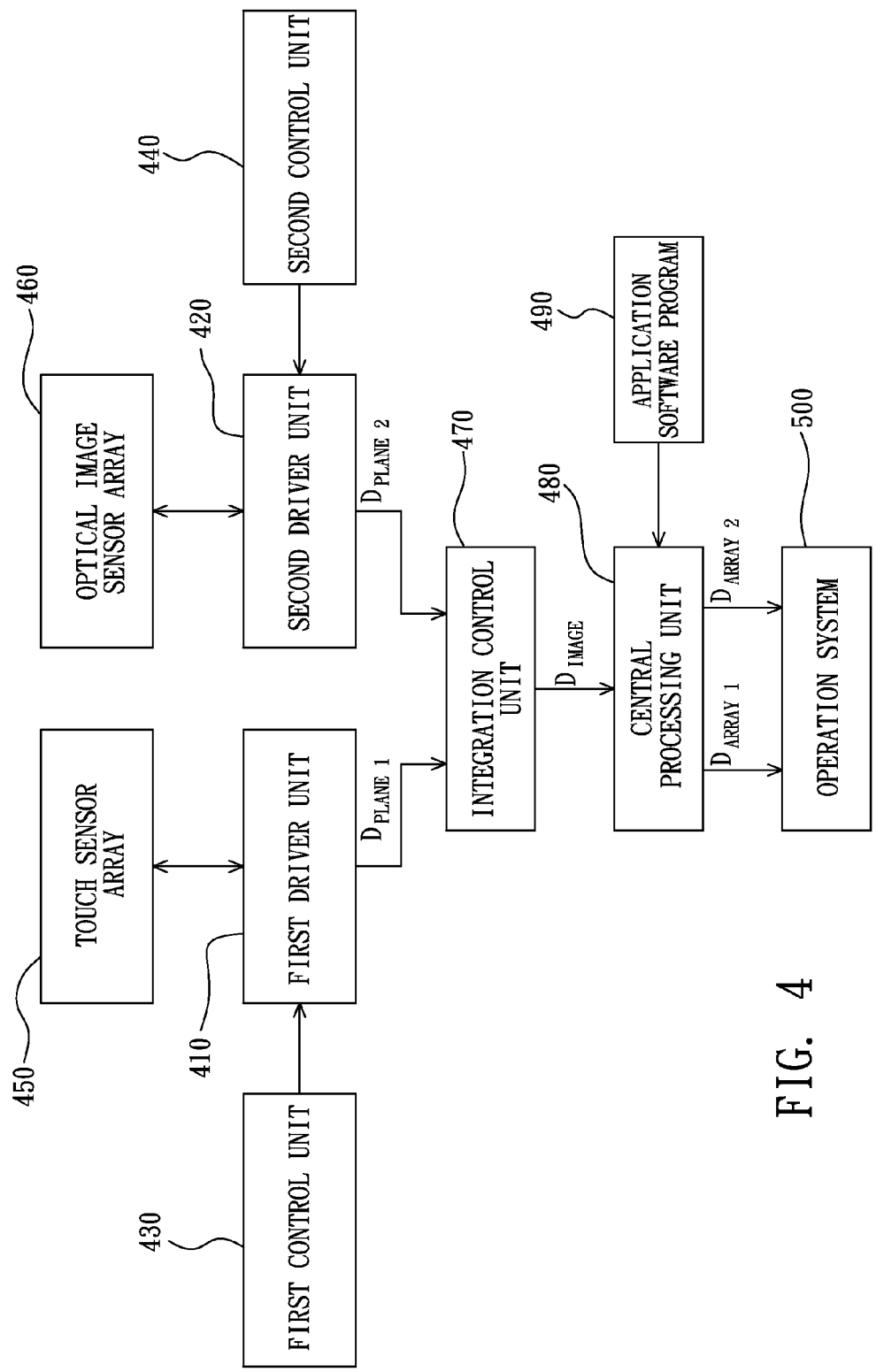
FIG. 4 illustrates the block diagram of a control system for integrating multiple sets of sensing plane data according to still another preferred embodiment of the present invention.

Please refer to FIG. 4, which illustrates the block diagram of a control system for integrating multiple sets of sensing plane data according to still another preferred embodiment of the present invention. As illustrated in FIG. 4, the control system includes a first driver unit 410, a second driver unit 420, a first control unit 430, a second control unit 440, a touch sensor array 450, an optical image sensor array 460, an integration control unit 470, a central processing unit 480, an application software program 490, and an operation system 500.

The first driver unit 410 is used for driving the touch sensor array 450 under the control of the first control unit 430, so as to receive a set of first sensing plane data $D_{PLANE1}$; the second driver unit 420 is used for driving the optical image sensor array 460 under the control of the second control unit 440, so as to receive a set of second sensing plane data $D_{PLANE2}$; wherein the touch sensor array 450 can be of resistive type, capacitive type, surface acoustic wave type, or electromagnetic type, and the optical image sensor array 460 can be a CCD or CMOS sensor array. The first driver unit 410 and the second driver unit 420 both have a multiplexer, an analog signal processing unit, and a timer/counter (please refer to FIG. 2). The multiplexer is used for scanning the touch sensor array 450 or the optical image sensor array 460 under the control of the timer/counter, so as to deliver a sensed signal to the analog signal processing unit. The analog signal processing unit can include an analog-to-digital converter or an analog signal modulator, wherein, the analog signal modulator is used for generating an AM signal, an FM signal, or a CVBS signal.

The integration control unit 470 is used for integrating the set of first sensing plane data $D_{PLANE1}$ and the set of second sensing plane data $D_{PLANE2}$ into a set of image data $D_{IMAGE}$, and transmitting the set of image data $D_{IMAGE}$ to the central processing unit 480 via an image data interface, wherein the central processing unit 480 is used for executing an application software program 490, which includes an image processing procedure, so as to convert the set of image data $D_{IMAGE}$ into a set of first array data $D_{ARRAY1}$ and a set of second array data $D_{ARRAY2}$, so that the operation system 500 can execute at least one corresponding function. The operation system 500 can be WINDOWS, UNIX, LINUX, MacOS, iOS, or Android. The corresponding function can be: generating a touch coordinate according to the set of first array data $D_{ARRAY1}$ and activating an object function corresponding to the touch coordinate; or displaying an optical sensed image according to the set of second array data $D_{ARRAY2}$, performing a comparison operation on the optical sensed image and a reference image, and determining the execution of a corresponding procedure according to the result of the comparison operation; or generating a multi dimensional sensed image according to the set of first array data $D_{ARRAY1}$ and the set of second array data $D_{ARRAY2}$, so as to provide a multi dimensional sensing function.

Besides, the set of image data $D_{IMAGE}$ can be formed by combining the set of first sensing plane data $D_{ARRAY1}$ and the set of second sensing plane data $D_{ARRAY2}$ in a parallel manner (please refer to FIG. 5(a)), or in an interlacing manner (please refer to FIG. 5(b)).

Preferably, the central processing unit 480 is also coupled to a display (not shown in the figure), which can be a CRT display, a liquid crystal display, an LED array display, an OLED (organic light emitting diode) display, a PLED (polymer light emitting diode) display, a CNT-FED (carbon nanotube field emission display), a MEMS (micro electro mechanical systems) array display, a plasma display, or an e-paper display.

The present invention therefore possesses the following advantages due to its novel design:

1. The present invention can utilize an image data interface to transmit multiple sets of sensing plane data—of same type or different types—to a central processing unit, so as to reduce the number of control units and relieve the workload of the control unit.

2. The image data interface of the present invention can greatly reduce the number of connection signals between a central processing unit and a plurality of sensor arrays.

3. The present invention can use an image data interface to transmit a set of image data, which is composed of multiple sets of sensing plane data, to a central processing unit, so that the central processing unit can convert the set of image data into multiple sets of array data, and generate a touch coordinate according to one set of the multiple sets of array data and activate an object function corresponding to the touch coordinate; or displaying a sensed image of a physical quantity, performing a comparison operation on the sensed image and a reference image, and determining the execution of a corresponding procedure according to the result of the comparison operation; or generating a multi dimensional sensed image according to some or all of the multiple sets of array data, so as to provide a multi dimensional sensing function.

4. The present invention can greatly reduce the workload of the sensor controllers, simplify the architecture of the whole sensing system, and thereby reduce the cost of the whole sensing system.

5. The present invention can integrate the driver programs for the multiple sensor arrays on the operation system's side, so as to facilitate the design of the whole sensing system.

6. The control system of the present invention can be implemented in a general operation system—like WINDOWS, UNIX, LINUX, MacOS, iOS, or Android, so the present invention possesses universality.

To sum up, the control system for integrating multiple sets of sensing plane data of the present invention is capable of saving the number of control units, simplifying the work of the control units, greatly reducing the number of connection signals between a central processing unit and a plurality of sensor arrays, providing multiple sensing control function, and possessing operation system universality. As a result, the present invention offers superior advantages.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A control system for integrating multiple sets of sensing plane data, comprising:
a plurality of driver units driving a plurality of sensor arrays and converting a plurality of sensed signals received from said plurality of sensor arrays into multiple sets of sensing plane data; and
at least one control unit integrating said multiple sets of sensing plane data into image data, and outputting said image data to a central processing unit, wherein said image data is formed by combining said multiple sets of sensing plane data and said central processing unit executes an application software program to convert said image data into multiple sets of array data so that an operating system executes at least one predetermined function.

2. The control system for integrating multiple sets of sensing plane data as claim 1, wherein each of said multiple sensor arrays is selected from a group consisting of touch sensor array, optical image sensor array, pressure sensor array, surface acoustic wave sensor array, flow sensor array, particle sensor array, and radio sensor array.

3. The control system for integrating multiple sets of sensing plane data as claim 1, wherein said set of image data is formed by combining said multiple sets of sensing plane data in a parallel manner.

4. The control system for integrating multiple sets of sensing plane data as claim 1, wherein said image data is formed by combining said multiple sets of sensing plane data in an interlacing manner.

5. The control system for integrating multiple sets of sensing plane data as claim 1, wherein each of said plurality of driver units comprises a multiplexer, an analog signal processing unit, and a timer/counter, so as to scan one of said multiple sensor arrays.

6. The control system for integrating multiple sets of sensing plane data as claim 5, wherein said analog signal processing unit comprises an analog-to-digital converter or an analog signal modulator.

7. The control system for integrating multiple sets of sensing plane data as claim 6, wherein said analog signal modulator is used for generating an AM signal, an FM signal, or a CVBS signal.

8. A control system for integrating multiple sets of sensing plane data, comprising:
a first driver unit driving a first sensor array and converting a first set of sensed signals received from said first sensor array into a set of first sensing plane data;
a second driver unit driving a second sensor array and converting a second set of sensed signals received from said second sensor array into a set of second sensing plane data; and
a control unit integrating said set of first sensing plane data and said set of second sensing plane data into image data, and outputting said image data to a central processing unit, wherein said image data is formed by combining the set of first sensing plane data with the set of second sensing plane data and said central processing unit executes an application software program to convert said image data into two sets of array data so that an operating system executes at least one predetermined function.

9. The control system for integrating multiple sets of sensing plane data as claim 8, wherein said first sensor array is a touch sensor array, said second sensor array is an optical image sensor array.

10. The control system for integrating multiple sets of sensing plane data as claim 8, wherein said set of image data is formed by combining said set of first sensing plane data and said set of second sensing plane data in a parallel manner.

11. The control system for integrating multiple sets of sensing plane data as claim 8, wherein said set of image data is formed by combining said set of first sensing plane data and said set of second sensing plane data in an interlacing manner.

12. The control system for integrating multiple sets of sensing plane data as claim 8, wherein said first driver unit and said second driver unit both have a multiplexer, an analog signal processing unit, and a timer/counter, so as to scan said first sensor array and said second sensor array respectively.

13. The control system for integrating multiple sets of sensing plane data as claim 12, wherein said analog signal processing unit comprises an analog-to-digital converter or an analog signal modulator.

14. The control system for integrating multiple sets of sensing plane data as claim 13, wherein said analog signal modulator is used for generating an AM signal, an FM signal, or a CVBS signal.

15. A control system for integrating multiple sets of sensing plane data, comprising:
a first driver unit driving a first sensor array and converting a first set of sensed signals received from said first sensor array into a set of first sensing plane data;

a second driver unit driving a second sensor array and converting a second set of sensed signals received from said second sensor array into a set of second sensing plane data;

a first control unit, coupled to said first driver unit for controlling a first sensing scan operation of said first sensor array;

a second control unit, coupled to said second driver unit for controlling a second sensing scan operation of said second sensor array; and an integration control unit, coupled to said first control unit and said second control unit for integrating said set of first sensing plane data and said set of second sensing plane data into a image data, and outputting said image data to a central processing unit, wherein said image data is formed by combining the set of first sensing plane data with the set of second sensing plane data, and wherein said central processing unit executes an application software program to convert said image data into two sets of array data so that an operating system executes at least one predetermined function.

16. The control system for integrating multiple sets of sensing plane data as claim 15, wherein said first sensor array is a touch sensor array, said second sensor array is an optical image sensor array.

17. The control system for integrating multiple sets of sensing plane data as claim 15, wherein said set of image data is formed by combining said set of first sensing plane data and said set of second sensing plane data in a parallel manner.

18. The control system for integrating multiple sets of sensing plane data as claim 15, wherein said set of image data is formed by combining said set of first sensing plane data and said set of second sensing plane data in an interlacing manner.

19. The control system for integrating multiple sets of sensing plane data as claim 15, wherein said first driver unit and said second driver unit both have a multiplexer, an analog signal processing unit, and a timer/counter, so as to scan said first sensor array and said second sensor array respectively.

20. The control system for integrating multiple sets of sensing plane data as claim 19, wherein said analog signal processing unit comprises an analog-to-digital converter or an analog signal modulator.

* * * * *